United States Patent Office 3,224,817
Patented Dec. 21, 1965

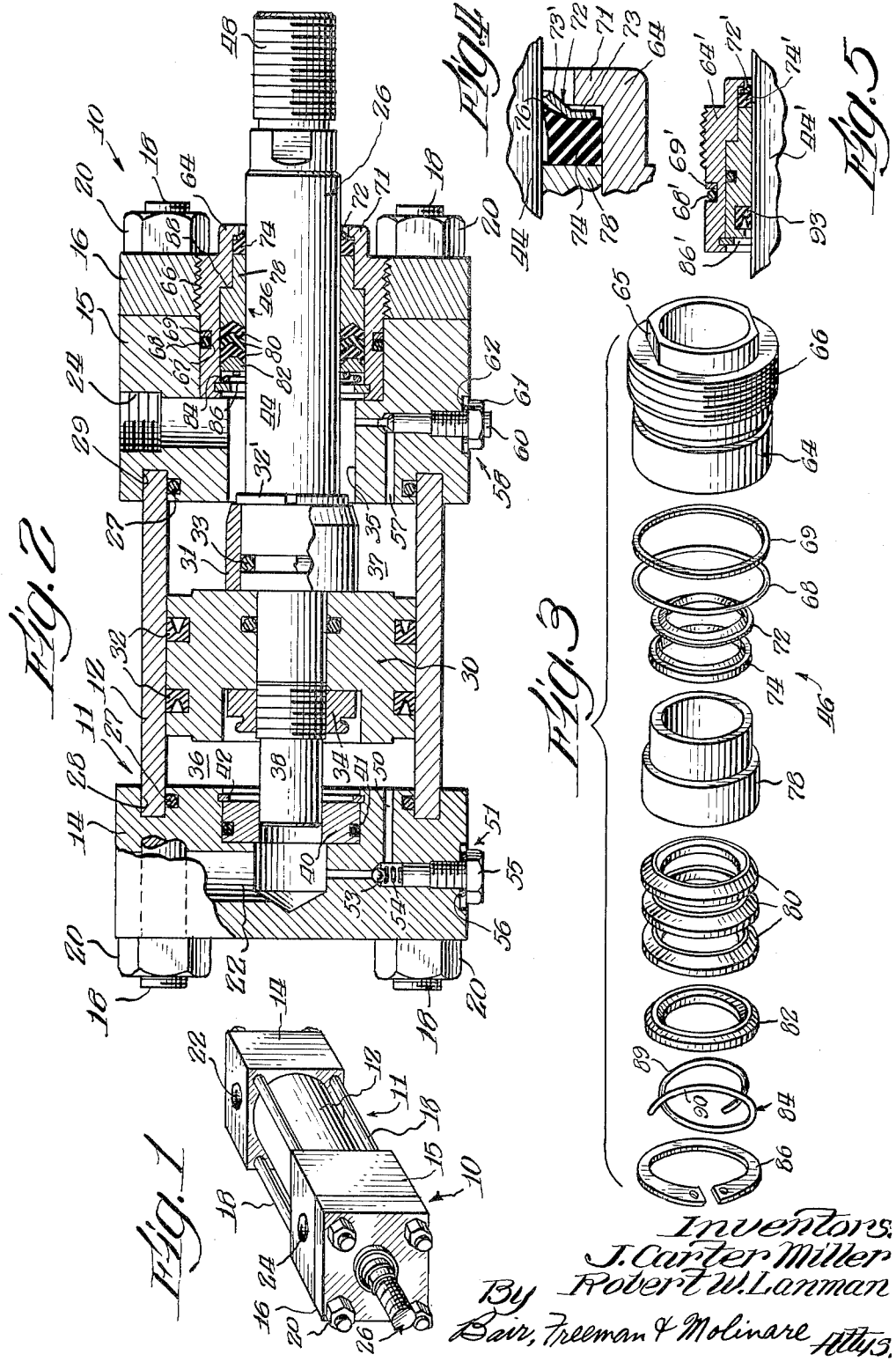

3,224,817
CYLINDER AND PISTON ARRANGEMENT
J. Carter Miller, Munster, and Robert W. Lanman, Hammond, Ind., assignors to Carter Controls, Inc., Lansing, Ill., a corporation of Illinois
Filed Aug. 13, 1962, Ser. No. 216,419
9 Claims. (Cl. 308—3.5)

This invention relates to a cylinder and piston arrangement and more particularly, to an improved bearing and seal cartridge assembly for use in such cylinder and piston arrangement.

In previous cylinder and piston arrangements, difficulty has been encountered in effectively sealing leakage between the piston rod and the cylinder and in replacing the seal about the piston rod. It was found that if the seal were compressed tightly to seal the leakage, greater wear occurred and the life of the seal was materially shortened. Further, the seal was subject to damage from foreign particles adhering to the reciprocating piston rod. Normally, the seal and bearing were separate from one another and disassembly of the seal from the cylinder and piston arrangement was complicated and required at least partial disassembly of the cylinder and piston arrangement.

An object of the present invention is to provide a cylinder and piston arrangement wherein the deficiencies and disadvantages of prior constructions is obviated.

Another object of the present invention is to provide a cylinder and piston arrangement with improved seal and bearing means.

A further object of the present invention is to provide a cylinder and piston arrangement with a bearing and seal cartridge assembly.

Yet another object of the present invention is to provide a bearing and seal cartridge assembly including seal means therein which are wear-compensated and spring-biased into operative association with the piston rod passing therethrough.

A still further object of the present invention is to provide a bearing and seal cartridge assembly for use in a cylinder and piston arrangement, such bearing and seal cartridge assembly including a rod scraper and a rod wiper for preventing chips and dirt from entering and damaging the cylinder.

Another object of the present invention is to provide a bearing and seal cartridge assembly for use in a cylinder and piston arrangement, such assembly including spring-biased chevron packing means constructed and arranged to have uniform pressure applied thereagainst.

It is a still further object of the present invention to provide a cylinder and piston arrangement with a bearing and seal cartridge assembly that is expeditiously removable and replaceable as a unit.

This invention relates to a cylinder and piston arrangement comprising in combination, a cylinder defining a compartment therein, a piston movable within said compartment and defining a first and a second chamber therein on each side of the piston, a piston rod connected to said piston for movement therewith, port means in the cylinder communicating said chambers with control fluid, and bearing and seal means for supporting said piston rod and for sealing the fluid within said compartment, said bearing and seal means being detachably connected to said cylinder and being removable as a unitary assembly therefrom.

This invention relates to a bearing and seal cartridge assembly for use in a cylinder and piston arrangement, such assembly including the combination of a generally cylindrical body having a bore extending therethrough adapted to receive a piston rod, a portion of the bore having substantially the same diameter as that of the piston rod and serving as a bearing, and seal means in the body for engaging the piston rod to prevent leakage from within the cylinder.

This invention further relates to a bearing and seal cartridge assembly for use in a cylinder and piston arrangement, the bearing and seal cartridge assembly comprising the combination of a generally cylindrical body having external threads over a portion thereof adapted to engage cooperating threads in said cylinder, a bore extending through said body adapted to receive a piston rod, a portion of said bore having substantially the same diameter as that of the piston rod and serving as a bearing, seal means in the body for engaging the piston rod to prevent leakage from within the cylinder, the seal means comprising chevron-type packing means, a washer member engaging one side of said packing means, the other side of said packing means engaging a shoulder in said body, resilient means for urging said washer member toward said shoulder, and means for retaining the packing means, washer member and resilient means in the body, a rod scraper floatingly retained in the body for scraping foreign particles from the surface of the piston rod, a wiper in the body adjacent the rod scraper, the wiper cooperating with the rod scraper to partially define a chamber for receiving fine foreign particles, the fine foreign particles accumulating in the chamber on one stroke of the piston rod and being removed from the chamber on the return stroke of the piston rod, and an O-ring disposed about the body between the body and the cylinder, said O-ring being constructed and arranged to coact with the cylinder to prevent rotation of the body with respect to the cylinder as well as to prevent leakage from between the body of the bearing and seal cartridge assembly and the cylinder.

The above and other objects and features of the invention will be more readily apparent from the following description when read in connection with the accompanying drawing, in which:

FIGURE 1 is a perspective view of a cylinder and piston arrangement embodying the present invention;

FIGURE 2 is a longitudinal cross-sectional view through the cylinder and piston arrangement embodying the present invention;

FIGURE 3 is an exploded view of the components of the bearing and seal cartridge assembly of the present invention;

FIGURE 4 is a fragmentary view on an enlarged scale of the bearing and cartridge assembly, illustrating the relationship between the rod wiper and rod scraper; and FIGURE 5 is a fragmentary cross-sectional view through the cylinder and piston arrangement illustrating a modification of the bearing and seal cartridge assembly.

The cylinder and piston arrangement 10 illustrated in FIGURE 1 includes a cylinder 11 having a tubular housing 12, preferably cylindrical in cross section and constructed of steel or brass. Affixed on each end of the tubular housing 12 are end cover plates or heads 14 and 15, respectively. Adjacent to and coupled with the head 15 is a head plate 16. The means for connecting the various members defining the cylinder include the tie rods 18 which extend through suitable openings in the heads 14 and 15 and the head plate 16, and the rod nuts 20 which are secured to the threads on the opposite ends of the tie rods 18.

Provided in the heads 14 and 15 are suitable ports 22 and 24 respectively, adapted to communicate the cylinder with the apparatus to be controlled thereby via liquid lines or pipes.

The piston rod 26 extends through an opening in head plate 16 and is adapted to be connected to a mechanism to be actuated.

Referring now to FIGURE 2, there is illustrated a longitudinal cross-sectional view of the cylinder and piston arrangement of FIGURE 1. It is apparent from FIGURE 2 that the tubular housing 12 is seated in suitable recesses 28 and 29 in the heads 14 and 15 respectively, and that O-rings 27 are provided to prevent leakage from between the heads and the tubular housing 12.

Connected to the piston rod 26 within the tubular housing 12 is a piston 30. Abutting one side of the piston 30 is a cushion valve 31. The end of the cushion valve 31 opposite the piston 30 abuts a retaining ring 32′. The cushion valve 31 and the piston 30 are retained on the piston rod 26 in operative relationship to one another by means of the lock nut 34.

An O-ring seal 33 is provided between the piston rod 26 and the cushion valve 31 to provide for floating action of the cushion valve 31 radially of the axis of the piston rod 26. By virtue of the floating action of the cushion valve 31, the valve is self-aligning as it enters the bore portion 35 of head 15.

Suitable seal means 32 are provided on the piston 30 to prevent leakage from the chamber 36 defined on one side of the piston 30 in the tubular housing 12 to the chamber 37 defined on the other side of the piston 30 in the tubular housing 12. As illustrated such seal means may comprise C-ring seals. It will be apparent to those having skill in the art that other seal means may be used, as for example, cast iron piston rings.

The blind end 38 of the piston rod 26 is adapted to ride within cushion bearing or adapter 40. The cushion adapter 40 is mounted on O-ring 41 to permit limited radial movement on the adapter and thereby be self-aligning. Retaining ring 42 is provided to retain the cushion bearing 40 in place within the end plate 14.

The median portion 44 of the piston rod 26 is adapted to ride within the bearing and seal cartridge assembly 46 of the present invention. The end 48 of the piston rod is adapted to be suitably connected to an apparatus to be actuated. In the illustrated embodiment of the invention, the end 48 is provided with external threads adapted to engage the internal threads on a connecting apparatus.

The chamber 36 in tubular housing 12 communicates with the port 22 by means of a bypass passage 50. Within the passageway, there is provided a check valve assembly 51 comprising the ball 53, spring-biased to the closed position by the spring 54. The spring acts between the ball 53 and the valve plug 55. A suitable seal, preferably an O-ring 56, is provided between the head of the plug 55 and the head 14.

A bypass passage 57 communicates the chamber 37 in the tubular housing 12 with the port 24 in the head 15. The passage of fluid through the bypass passage 57 is regulated by the needle valve assembly 58. The needle valve assembly 58 comprises an adjustable spindle 60 having external threads thereon which cooperate with internal threads in a bore in the head 15. After the adjustable spindle 60 has been properly positioned, the lock nut 61 is tightened to retain the spindle in adjusted position. A suitable seal 62, preferably an O-ring, is provided to prevent leakage from between the spindle 60 and the head 15. To provide for simple position options, the needle valve assembly 58 and check valve assembly 51 are interchangeable. It will be understood that a pair of bypass passages 50 and 57 are provided at each end of the cylinder. However, for clarity, only one passage is shown at each end of FIGURE 2.

The bearing and seal cartridge assembly 46 of the present invention comprises a housing or body 64 having external threads 66 thereon adapted to cooperate with internal threads in the head 16 of cylinder 11. Disposed in a recess 67 in the outer surface of body 64 are an O-ring 68 and a backup ring 69. The O-ring 68 functions to prevent leakage between the body 64 and the head 15. In addition, the friction of the O-ring 68 created between the body 64 and the end plate 15 prevent rotation between the body and the cylinder and thus assist to retain the body in place within the cylinder 11.

Considering both FIGURES 1 and 4, it is seen that the outer end of the body 64 comprises an inturned flange 71. It will be noted that there is substantial clearance between the bore defined by the inturned flange 71 and the piston rod 26. Abutting the inside face of the internal flange 71 is a rod scraper 72, preferably made from metal. The rod scraper comprises a radially extending portion 73 and an oblique portion 73′, the oblique portion being adapted to engage the circumference of the piston rod 26 for the purpose of scraping chips and dirt from the piston rod and preventing such chips and dirt from entering the cylinder. The rod scraper is floatingly mounted in the body 64 for movement radially of the axis of the piston rod 26.

Adjacent the rod scraper, there is provided a wiper 74 made from rubber or polytetrafluoroethylene. If desired, the wiper may be made from sintered metal. The wiper is adapted to abut the exterior surface of the median portion 44 of the piston rod 26. Defined between the rod wiper 74, the piston rod 26, and the rod scraper 72 is a chamber 76. Fine particles which are not scraped from the surface of piston rod 26 on the return stroke of the piston rod 26 accumulate in chamber 76 and are removed from the chamber on the forward stroke of the piston rod 26.

Slidably disposed in the bore within the body 64 is a bearing insert or rod bearing 78. The bearing insert, which is preferably made from cast iron, is elongated to provide an extra long bearing surface for the piston rod 26. Retained within the body 64 between the body and piston rod 26 are the seal means, which comprise a plurality of chevron-type packings 80, a washer-like member or adapter 82, a spring 84 and a retaining ring 86.

It will be noted that the bearing insert 78 is slip-fit into the body 64 and abuts against the shoulder 88 in the body 64 in a manner so as to retain the rod wiper and rod scraper but to apply no pressure against the rod wiper or rod scraper. However, by virtue of the slip-fit or slide-fit, the bearing insert 78 can float in the body as the piston rod reciprocates. This action of the insert 78 permits the packing to breathe. By this, it is meant that as the piston rod reciprocates, the bearing insert can move somewhat with the piston rod and cause the chevron-type packings 80 to flex against the compression of the springs 84. This flexure of the V or chevron-type packings provide for long life of the packing.

Considering now FIGURE 3, there is disclosed an exploded perspective view of the bearing and seal cartridge assembly of the present invention. From this view, it is apparent that the spring has a novel configuration. The outer turn 89 of spring 84 is constructed and arranged to be in contact with the inside of the body or housing 64 through more than 180 degrees. By virtue of this construction, the spring may not shift against the shaft or piston rod during flexure of the spring in operation. The spring 84 further has an inner turn 90 which bears on the adapter 82 through more than 180 degrees. This arrangement permits a uniform pressure to be applied against the chevron or V-type packings so as not to tighten the packings too much, but to permit the packings to breathe in operation as the piston rod reciprocates. By virtue of the present construction, the spring pressure is uniformly provided against the packing, the packing is permitted to breathe, and the life thereof is materially extended.

The outer end of body 64 is machined or otherwise formed to provide planar, parallel surfaces 65 to permit attachment of a tool thereto. Thus, when the end 48 is disengaged, the body 64 may be easily rotated and the bearing and seal cartridge assembly may be externally removed or installed as a unit without removing the piston from the cylinder and without any cylinder disassembly.

In FIGURE 5, there is illustrated a modification of the bearing and seal cartridge assembly. In all respects, the assembly is the same except for the provision of a different type seal means, therefore like components are designated by prime numerals. In the modification shown in FIGURE 5, a C-type seal ring 93 is substituted for the chevron-type packing, the washer, and the spring of the preferred modification of the invention.

It will be apparent that the present invention may be utilized with cylinder and piston arrangements using either air or hydraulic fluid. The metal rod scraper and the rubber rod wiper cooperate with one another to provide double protection against chips and dirt entering and damaging the cylinder. In the preferred embodiment of the invention, the seal in the bearing and seal cartridge assembly is spring-loaded and thereby wear-compensated for long life. Minimum leakage and wipage are provided by the present construction. The bearing insert which may be made from cast iron provides an elongated bearing surface for the median portion 44 of the piston rod 26.

While we have shown one preferred embodiment of the invention and one modification thereof, it will be understood that these are illustrative only and not to be taken as a definition of the scope of the invention, reference being had for this purpose to the appended claims.

We claim:

1. A bearing and seal cartridge assembly for use in a piston and cylinder arrangement, the cartridge assembly including the combination of a generally cylindrical body having a bore extending therethrough adapted to receive a piston rod and being of larger diameter than the piston rod, a tubular part in one end of said bore having substantially the same internal diameter as that of the piston rod and serving as a bearing for the piston rod, cooperating parts on said part and the body to limit movement of said part toward said one end of the body, said part terminating at one end in a substantially radial shoulder facing the other end of the body, seal means in said other end of said body comprising annular packing means fitting in the bore and seating at one end against the shoulder, a washer member engaging the other end of said packing means, resilient means urging said washer member toward said shoulder, and means for retaining said packing means, washer member and resilient means in said body.

2. The bearing and seal cartridge assembly of claim 1, including a rod scraper floatingly retained in the other end of said body for movement radially of the axis of the piston rod for scraping foreign particles from the surface of the piston rod.

3. The bearing and seal cartridge assembly of claim 1, wherein said resilient means comprises a coil spring having an outer turn in contact with the inside of the body through more than 180 degrees to prevent the coil spring from moving into engagement with the piston rod and having an inner turn engaging the washer member for more than 180 degrees for applying uniform pressure against the packing means.

4. A bearing and seal cartridge assembly for use in a piston and cylinder arrangement, the cartridge assembly including a combination of a generally cylindrical body having a bore extending therethrough adapted to receive a piston rod and of larger diameter than the piston rod, a part in said bore having substantially the same diameter as that of said piston rod and serving as a bearing; seal means in said body for engaging the piston rod to prevent leakage from within the cylinder, said seal means comprising packing means, a washer member engaging one side of said packing means, the other side of said packing means engaging one end of said part, resilient means for urging said washer member toward said part, and means for retaining said packing means, washer member and resilient means in said body; a rod scraper floatingly retained in said body for movement radially of the axis of the piston rod for scraping foreign particles from the surface of the piston rod; and a rod wiper provided in said body adjacent the rod scraper, said rod wiper being adapted to contact the outer surface of the piston rod, said rod wiper cooperating with said rod scraper to partially define a chamber for receiving fine, foreign particles, said fine, foreign particles accumulating in said chamber during one stroke of the piston rod and being removed from the chamber on the return stroke of the piston rod.

5. The bearing and seal cartridge assembly of claim 4, wherein said resilient means comprises a coil spring having an outer turn in contact with the inside of the body through more than 180 degrees to prevent the coil spring from moving into engagement with the piston rod and having an inner turn engaging the washer member for more than 180 degrees for applying uniform pressure against the packing means.

6. A bearing and seal cartridge assembly for use in a piston and cylinder arrangement comprising a tubular body having coaxial bores of different diameters joined by an annular shoulder, a bearing insert fitting slidably in the tubular body having portions of different external diameters fitting in the different diameter bores and an intermediate external shoulder abutting against said annular shoulder, a seal fitting in the larger diameter bore and seating against the larger diameter end of the bearing insert, and yieldable means retaining the seal in the bore and yieldable in response to axial force on the bearing insert to permit the seal to breathe.

7. A bearing and seal cartridge assembly for use in a piston and cylinder arrangement comprising a tubular body having coaxial bores of different diameters joined by an annular shoulder, a bearing insert fitting slidably in the tubular body having portions of different external diameters fitting in the different diameter bores and an intermediate external shoulder abutting against said annular shoulder, the smaller diameter end of the bearing insert terminating short of the smaller diameter end of the body, an inwardly turned lip on the smaller diameter end of the body spaced from the smaller diameter end of the bearing insert, and a rod scraper mounted in the space between the lip and the small diameter end of the bearing insert for radial floating movement.

8. A bearing and seal cartridge assembly for use in a piston and cylinder arrangement comprising a tubular body having coaxial bores of different diameters joined by an annular shoulder, a bearing insert fitting slidably in the tubular body having portions of different external diameters fitting in the different diameter bores and an intermediate external shoulder abutting against said annular shoulder, the smaller diameter end of the bearing insert terminating short of the smaller diameter end of the body, an inwardly turned lip on the smaller diameter end of the body spaced from the smaller diameter end of the bearing insert, a rod scraper mounted in the space between the lip and the small diameter end of the bearing insert for radial floating movement, and a rod wiper mounted between the scraper and the smaller diameter end of the bearing insert, the adjacent surfaces of the rod wiper and rod scraper lying at an acute angle to each other to define a chamber for receiving fine foreign particles.

9. A bearing and seal cartridge assembly for use in a piston and cylinder arrangement comprising a tubular body having coaxial bores of different diameters joined by an annular shoulder, a bearing insert fitting slidably in the tubular body having portions of different external diameters fitting in the different diameter bores and an intermediate external shoulder abutting against said annular shoulder, a seal fitting in the larger diameter bore and seating against the larger diameter end of the bearing insert, yieldable means retaining the seal in the bore and yieldable in response to axial force on the bearing insert to permit the seal to breathe, the smaller diameter end of the bearing insert terminating short of the smaller diameter end of the body, an inwardly turned lip on the smaller diameter end of the body spaced from the smaller diameter end of the bearing insert, a rod scraper mounted in the space between the lip and the small diameter end of the bearing insert for radial floating movement, and a rod wiper mounted between the scraper and the smaller diameter end of the bearing insert, the adjacent surfaces of the rod wiper and rod scraper lying at an acute angle to each other to define a chamber for receiving fine foreign particles.

References Cited by the Examiner

UNITED STATES PATENTS

| | | | |
|---|---|---|---|
| 2,644,701 | 7/1953 | Flick | 277—24 |
| 2,707,135 | 4/1955 | Monaham | 308—3.5 |
| 2,897,785 | 8/1959 | Ortman | 277—35 X |
| 2,957,712 | 10/1960 | Farmer | 308—3.5 |
| 2,973,744 | 3/1961 | Hennels | 277—35 X |
| 2,979,350 | 4/1961 | Lansky | 277—24 |
| 2,982,590 | 5/1961 | Gunning | 277—24 X |
| 3,084,945 | 4/1963 | Alexander | 277—24 X |

FOREIGN PATENTS 876,312  8/1961  Great Britain.

ROBERT C. RIORDON, *Primary Examiner.*

SAMUEL B. ROTHBERG, *Examiner.*